US012252003B2

(12) United States Patent
Honjo (10) Patent No.: US 12,252,003 B2
(45) Date of Patent: Mar. 18, 2025

(54) VEHICLE TEMPERATURE CONTROL SYSTEM

(71) Applicant: HONDA MOTOR CO., LTD., Tokyo (JP)

(72) Inventor: Takuya Honjo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 297 days.

(21) Appl. No.: 17/898,912

(22) Filed: Aug. 30, 2022

(65) Prior Publication Data

US 2023/0093610 A1 Mar. 23, 2023

(30) Foreign Application Priority Data

Sep. 21, 2021 (JP) ................................. 2021-153638

(51) Int. Cl.
  *B60K 11/08* (2006.01)
  *B60K 1/00* (2006.01)
(52) U.S. Cl.
  CPC ...... *B60K 11/085* (2013.01); *B60K 2001/006* (2013.01)
(58) Field of Classification Search
  CPC ............ B60K 11/085; B60K 2001/006; B60K 11/02; B60Y 2400/302; Y02T 10/88
  See application file for complete search history.

(56) References Cited

U.S. PATENT DOCUMENTS

| | | | |
|---|---|---|---|
| 6,201,365 B1 | 3/2001 | Hara et al. | |
| 6,323,613 B1 | 11/2001 | Hara et al. | |
| 6,340,006 B1 * | 1/2002 | Malatto | F01P 3/00 |
| | | | 123/41.29 |
| 9,169,801 B2 * | 10/2015 | Mehring | F02F 7/00 |
| 10,041,698 B2 * | 8/2018 | Yamamoto | F04B 41/00 |
| 11,220,950 B2 * | 1/2022 | Perfetto | F01M 5/007 |
| 2013/0156548 A1 * | 6/2013 | Takano | F25B 31/004 |
| | | | 415/114 |
| 2016/0258343 A1 * | 9/2016 | Mushiga | F01P 7/162 |
| 2018/0119827 A1 * | 5/2018 | Ozeki | F16K 27/065 |
| 2018/0209324 A1 * | 7/2018 | Schwartz | F01P 7/048 |
| 2020/0063640 A1 * | 2/2020 | Lee | F01P 7/165 |

FOREIGN PATENT DOCUMENTS

| | | |
|---|---|---|
| JP | 2001-238406 A | 8/2001 |
| JP | 2019-103334 A | 6/2019 |

* cited by examiner

*Primary Examiner* — Kurt Philip Liethen
(74) *Attorney, Agent, or Firm* — Paratus Law Group, PLLC (57) ABSTRACT

A vehicle temperature control system includes: a first temperature control circuit; a second temperature control circuit; a heat exchanger in which heat exchange between a first temperature control medium and a second temperature control medium is performed; and a control device. The control device is capable of controlling a flow rate control valve based on a temperature of the first temperature control medium and a temperature of the second temperature control medium. In a case where the temperature of the first temperature control medium is lower than the temperature of the second temperature control medium, the control device controls the flow rate control valve such that a flow rate to a second branch flow path is larger than a flow rate in a case where the temperature of the first temperature control medium is higher than the temperature of the second temperature control medium.

3 Claims, 4 Drawing Sheets

VEHICLE TEMPERATURE CONTROL SYSTEM

CROSS-REFERENCE TO RELATED APPLICATIONS

This application is based on and claims priority under 35 USC 119 from Japanese Patent Application No. 2021-153638 filed on Sep. 21, 2021, the contents of which are incorporated herein by reference.

TECHNICAL FIELD

The present disclosure relates to a vehicle temperature control system.

BACKGROUND ART

In recent years, as a specific measure against global climate change, efforts for realizing a low-carbon society or a decarbonized society have become active. Also in vehicles, a reduction in a $CO_2$ emission has been strongly required, and electrification of a drive source has been progressing rapidly. Specifically, development of a vehicle including an electric motor (hereinafter, also referred to as a "rotary electric machine") as a drive source and a battery as a secondary battery capable of supplying electric power to the electric motor, such as an electric automobile or a hybrid electric automobile, has been advanced (hereinafter, the vehicle is also referred to as an "electric vehicle"). In addition, such an electric vehicle also includes an electric-power conversion unit that performs conversion of electric power, a gearbox that constitutes a transmission device, and the like. Further, such an electric vehicle is equipped with a vehicle temperature control system that performs temperature control of the rotary electric machine, the electric-power conversion unit, and the like.

For example, JP-A-2001-238406 (hereinafter, referred to as Patent Literature 1) discloses a vehicle temperature control system including a circulation path L through which oil circulates to cool an electric motor M, a circulation path F through which cooling water circulates to cool an inverter U, and a heat exchange part (oil cooler C) in which heat exchange between the cooling water flowing through the circulation path F and the oil flowing through the circulation path L is performed.

Further, JP-A-2019-103334 (hereinafter, referred to as Patent Literature 2) discloses a technique of performing control in which, when a temperature of oil is lower than a predetermined value, a discharge amount of an electric water pump is reduced so that the temperature of the oil increases, and when the temperature of the oil is equal to or higher than the predetermined value, the discharge amount of the electric water pump is changed in proportion to a vehicle speed so that the temperature of the oil decreases.

When a temperature of oil that lubricates a rotary electric machine and a gearbox is low, a friction loss of the rotary electric machine and the gearbox increases. Therefore, when the temperature of the oil that lubricates the rotary electric machine and the gearbox is relatively low, it is desirable to raise the temperature of the oil as early as possible, and there is room for improvement in this aspect in the related art.

The present disclosure provides a vehicle temperature control system capable of suppressing an increase in friction loss of a rotary electric machine and a gearbox.

SUMMARY

The present disclosure provides a vehicle temperature control system, including:

a first temperature control circuit that is provided with a first pump and that is configured to perform temperature control of a rotary electric machine and a gearbox provided in a vehicle;

a second temperature control circuit that is provided with a second pump and that is configured to perform temperature control of an electric-power conversion unit provided in the vehicle;

a heat exchanger in which heat exchange between a first temperature control medium circulating through the first temperature control circuit and a second temperature control medium circulating through the second temperature control circuit is performed; and a control device, in which the first temperature control circuit includes a first temperature sensor configured to detect a temperature of the first temperature control medium, in which the second temperature control circuit includes
 a second temperature sensor configured to detect a temperature of the second temperature control medium,
 a radiator with which heat exchange between the second temperature control medium and outside air is performed,
 a first branch flow path of the second temperature control medium that bypasses the heat exchanger,
 a second branch flow path of the second temperature control medium that passes through the heat exchanger, and
 a flow rate control valve with which a flow rate of the second temperature control medium to the second branch flow path is controlled, and in which the control device is capable of controlling the flow rate control valve based on the temperature of the first temperature control medium detected by the first temperature sensor and the temperature of the second temperature control medium detected by the second temperature sensor, and
 in a case where the temperature of the first temperature control medium is lower than the temperature of the second temperature control medium, the control device controls the flow rate control valve such that a flow rate to the second branch flow path is larger than a flow rate in a case where the temperature of the first temperature control medium is higher than the temperature of the second temperature control medium.

According to the present disclosure, it is possible to suppress an increase in friction loss of a rotary electric machine and a gearbox.

BRIEF DESCRIPTION OF DRAWINGS

Exemplary embodiments of the present disclosure will be described in detail based on the following figures, wherein.

DESCRIPTION OF EMBODIMENTS

Hereinafter, an embodiment of a vehicle equipped with a vehicle temperature control system according to the present disclosure will be described with reference to the accompanying drawings. It should be noted that the drawings are to be viewed according to orientation of the reference signs. In the present specification and the like, in order to simplify and clarify the description, a front-rear direction, a left-right direction, and an up-down direction are described in accordance with directions viewed from a driver of the vehicle. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D.

[Vehicle]

Figure 1:
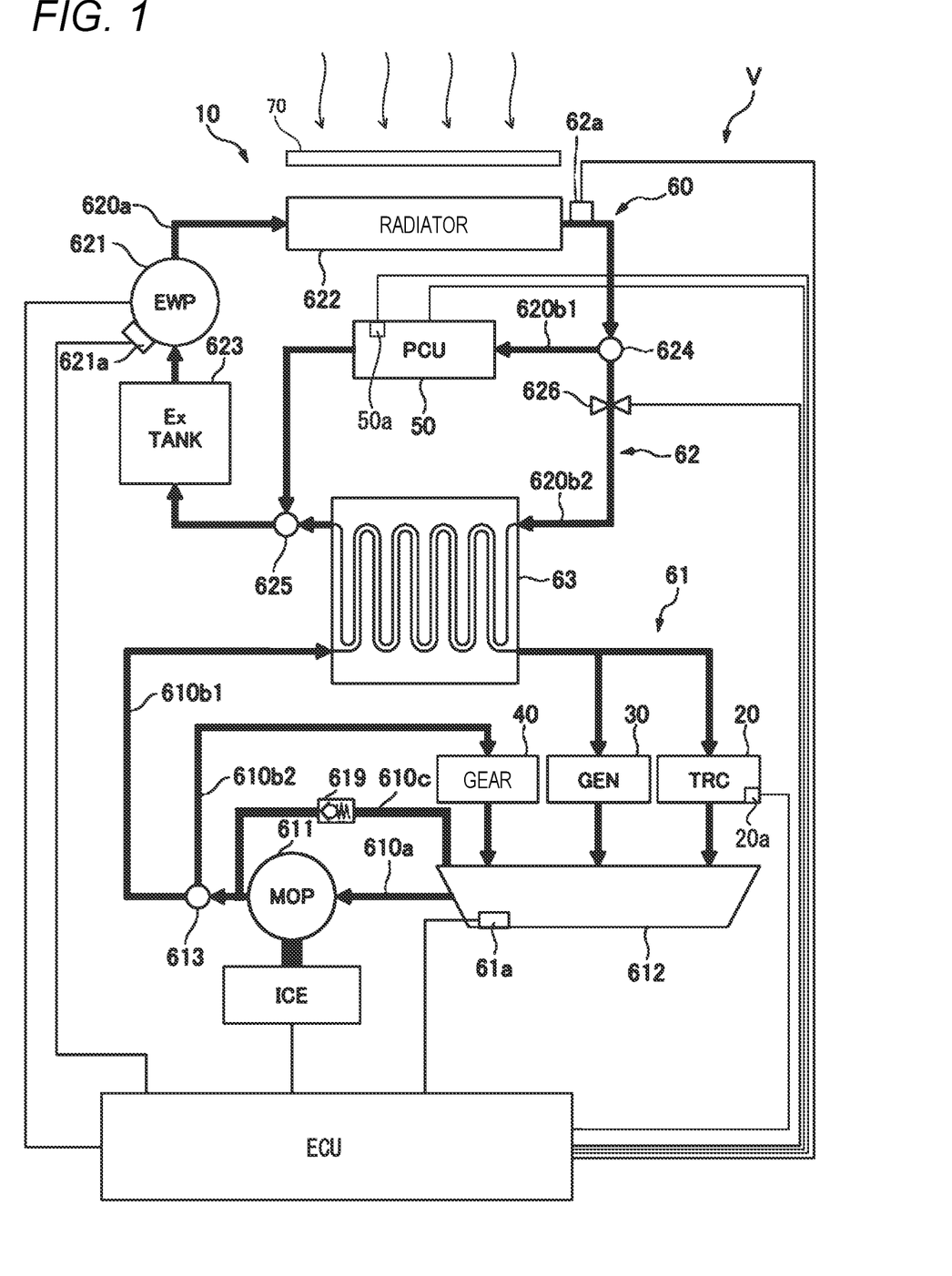
FIG. 1 is a block diagram illustrating an example of a vehicle equipped with a vehicle temperature control system according to an embodiment.

First, a vehicle according to the present embodiment will be described with reference to FIG. 1. As illustrated in FIG. 1, a vehicle V of the present embodiment includes an internal combustion engine ICE, a control device ECU, a vehicle temperature control system 10, an electric motor 20, a generator 30, a transmission device 40, an electric-power conversion unit 50, and a temperature control circuit 60.

The electric motor 20 is a rotary electric machine that outputs power for driving the vehicle V using electric power stored in an electrical storage device (not illustrated) mounted on the vehicle V or electric power generated by the generator 30. During braking of the vehicle V, the electric motor 20 may generate electric power using kinetic energy of drive wheels of the vehicle V to charge the electrical storage device described above. The electric motor 20 is provided with a third temperature sensor 20a that detects a temperature of the electric motor 20. The third temperature sensor 20a outputs a detection value of the temperature of the electric motor 20 to the control device ECU.

The generator 30 is a rotary electric machine that generates electric power using power of the internal combustion engine ICE, and charges the electrical storage device described above, or supplies the electric power to the electric motor 20.

The transmission device 40 is provided between the electric motor 20 and the drive wheels of the vehicle V, and is a power transmission device configured to be able to transmit the power between the electric motor 20 and the drive wheels. For example, the transmission device 40 is a gear-type power transmission device that moderates the power output from the electric motor 20 and transmits the moderated power to the drive wheels.

The electric-power conversion unit 50 includes a power drive unit (PDU) (not illustrated) that converts electric power output from the electrical storage device described above from direct current to alternating current and controls input and output electric power of the electric motor 20 and the generator 30, and a voltage control unit (VCU) (not illustrated) that boosts a voltage of electric power output from the electrical storage device described above as necessary. When the electric motor 20 generates electric power during braking of the vehicle V, the VCU may step down a voltage of the electric power generated by the electric motor 20. The electric-power conversion unit 50 is provided with a fourth temperature sensor 50a that detects a temperature of the electric-power conversion unit 50. The fourth temperature sensor 50a outputs a detection value of the temperature of the electric-power conversion unit 50 to the control device ECU.

The temperature control circuit 60 includes a first temperature control circuit 61 through which a non-conductive first temperature control medium TCM1 circulates to control temperatures of the electric motor 20, the generator 30, and the transmission device 40, a second temperature control circuit 62 through which a conductive second temperature control medium TCM2 circulates to control the temperature of the electric-power conversion unit 50, and a heat exchanger 63 in which heat exchange between the first temperature control medium TCM1 and the second temperature control medium TCM2 is performed. The non-conductive first temperature control medium TCM1 is, for example, oil that is called automatic transmission fluid (ATF) and can lubricate the electric motor 20, the generator 30, and the transmission device 40 and control the temperatures thereof. The conductive second temperature control medium TCM2 is, for example, cooling water that is called long life coolant (LLC).

The first temperature control circuit 61 is provided with a first pump (MOP) 611 and a storage part 612. The first pump 611 is a mechanical pump driven by the power of the internal combustion engine ICE and a rotational force of an axle (not shown) of the vehicle V. The storage part 612 stores the first temperature control medium TCM1 circulating through the first temperature control circuit 61. The storage part 612 is, for example, an oil pan provided at a bottom of a housing (not illustrated) in which the electric motor 20, the generator 30, and the transmission device 40 are housed.

The first temperature control circuit 61 includes a pressure feeding flow path 610a in which the first pump 611 is provided, a first branch flow path 610b1 in which the electric motor 20 and the generator 30 are provided, a second branch flow path 610b2 in which the transmission device 40 is provided, and a branching portion 613 at which the first temperature control circuit 61 branches into the first branch flow path 610b1 and the second branch flow path 610b2.

The pressure feeding flow path 610a passes through the first pump 611, an upstream end portion thereof is connected to the storage part 612, and a downstream end portion thereof is connected to the branching portion 613. The first branch flow path 610b1 passes through the electric motor 20 and the generator 30, an upstream end portion thereof is connected to the branching portion 613, and a downstream end portion thereof is connected to the storage part 612. The second branch flow path 610b2 passes through the transmission device 40, an upstream end portion thereof is connected to the branching portion 613, and a downstream end portion thereof is connected to the storage part 612.

In the first temperature control circuit 61, the heat exchanger 63 is disposed upstream of the electric motor 20 and the generator 30 in the first branch flow path 610b1. Therefore, in the first temperature control circuit 61, a first flow path and a second flow path of the first temperature control medium TCM1 are formed in parallel. Specifically, in the first flow path, the first temperature control medium TCM1 pressure-fed from the first pump 611 flows through the first branch flow path 610b1 from the branching portion 613, is cooled by the heat exchange with the second temperature control medium TCM2 in the heat exchanger 63, is supplied to the electric motor 20 and the generator 30 to lubricate the electric motor 20 and the generator 30 and control the temperatures thereof, and then is stored in the storage part 612. In the second flow path, the first temperature control medium TCM1 pressure-fed from the first pump 611 flows through the second branch flow path 610b2 from the branching portion 613, is supplied to the transmission device 40 to lubricate the transmission device 40 and control the temperature thereof, and then is stored in the storage part 612. The first temperature control medium TCM1 stored in the storage part 612 flows through the pressure feeding flow path 610a and is supplied to the first pump 611, thereby the first temperature control medium TCM1 circulating through the first temperature control circuit 61.

In the present embodiment, the first branch flow path 610b1 and the second branch flow path 610b2 are formed such that a flow rate of the first temperature control medium TCM1 flowing through the first branch flow path 610b1 is larger than a flow rate of the first temperature control medium TCM1 flowing through the second branch flow path 610b2.

The first temperature control circuit 61 is provided with a first temperature sensor 61a that detects a temperature of the first temperature control medium TCM1 circulating through the first temperature control circuit 61. In the present embodiment, the first temperature sensor 61a is provided in the storage part 612. Which is an oil pan, and detects the temperature of the first temperature control medium TCM1 stored in the storage part 612. The first temperature sensor 61a outputs a detection value of the temperature of the first temperature control medium TCM1 stored in the storage part 612 to the control device ECU.

The first temperature control circuit 61 further includes a pressure control circuit 610c provided with a pressure control valve 619. An upstream end portion of the pressure control circuit 610c is connected to the storage part 612, and a downstream end portion of the pressure control circuit 610c is connected to the pressure feeding flow path 610a downstream of the first pump 611. The pressure control valve 619 may be a check valve or an electromagnetic valve such as a solenoid valve. When a liquid pressure of the first temperature control medium TCM1 pressure-fed from the first pump 611 becomes equal to or higher than a predetermined pressure, the pressure control valve 619 is opened, and a part of the first temperature control medium TCM1 pressure-fed from the first pump 611 is returned to the storage part 612. Accordingly, the liquid pressure of the first temperature control medium TCM1 flowing through the first branch flow path 610b1 and the second branch flow path 610b2 is maintained at the predetermined pressure or lower.

The second temperature control circuit 62 is provided with a second pump (EWP) 621, a radiator 622, and a storage tank 623. The second pump 621 is, for example, an electric pump that is driven by the electric power stored in the electrical storage device. A rotational speed sensor 621a that detects a rotational speed of the second pump 621 is attached to the second pump 621. The rotational speed sensor 621a outputs a detection value of the rotational speed of the second pump 621 to the control device ECU.

The radiator 622 is disposed at a front portion of the vehicle V, and is a heat dissipation device that cools the second temperature control medium TCM2 by traveling wind formed during traveling of the vehicle V. A grille shutter 70, which is configured so as to be able to control an amount of outside air blowing against the radiator 622, is provided in front of the radiator 622. An example of the grille shutter 70 will be described later with reference to FIG. 2.

The storage tank 623 is a tank in which the second temperature control medium TCM2 circulating through the second temperature control circuit 62 is temporarily stored. Even when cavitation occurs in the second temperature control medium TCM2 circulating through the second temperature control circuit 62, the cavitation occurring in the second temperature control medium TCM2 disappears because the second temperature control medium TCM2 circulating through the second temperature control circuit 62 is temporarily stored in the storage tank 623.

The second temperature control circuit 62 includes a branching portion 624 and a merging portion 625. In the second temperature control circuit 62, the storage tank 623, the second pump 621, and the radiator 622 are provided in this order from an upstream side. The second temperature control circuit 62 further includes a pressure feeding flow path 620a. The pressure feeding flow path 620a passes through the storage tank 623, the second pump 621, and the radiator 622, an upstream end portion thereof is connected to the merging portion 625, and a downstream end portion thereof is connected to the branching portion 624. The second temperature control medium TCM2 stored in the storage tank 623 is pressure-fed by the second pump 621 through the pressure feeding flow path 620a, and is cooled by the radiator 622.

The second temperature control circuit 62 further includes a first branch flow path 620b1 in which the electric-power conversion unit 50 is provided, and a second branch flow path 620b2 in which the heat exchanger 63 is provided. The first branch flow path 620b1 passes through the electric-power conversion unit 50, an upstream end portion thereof is connected to the branching portion 624, and a downstream end portion thereof is connected to the merging portion 625. The second branch flow path 620b2 passes through the heat exchanger 63, an upstream end portion thereof is connected to the branching portion 624, and a downstream end portion thereof is connected to the merging portion 625.

In the present embodiment, a valve device 626 serving as a flow rate control valve is provided in a portion of the second branch flow path 620b2 upstream of the heat exchanger 63. The valve device 626 may be an on-off valve that switches the second branch flow path 620b2 between a fully open state and a fully closed state, or may be a variable flow rate valve capable of controlling a flow rate of the second temperature control medium TCM2 flowing through the second branch flow path 620b2. The valve device 626 is controlled by the control device ECU.

The second temperature control medium TCM2 pressure-fed by the second pump 621 and cooled by the radiator 622 in the pressure feeding flow path 620a branches its flow into the first branch flow path 620b1 and the second branch flow path 620b2 at the branching portion 624. The second temperature control medium TCM2 flowing through the first branch flow path 620b1 cools the electric-power conversion unit 50, and merges with the second branch flow path 620b2 and the pressure feeding flow path 620a at the merging portion 625. The second temperature control medium TCM2 flowing through the second branch flow path 620b2 cools the first temperature control medium TCM1 by exchanging heat with the first temperature control medium TCM1 in the heat exchanger 63, and merges with the first branch flow path 620b1 and the pressure feeding flow path 620a at the merging portion 625. The second temperature control medium TCM2 flowing through the first branch flow path 620b1 and the second temperature control medium TCM2 flowing through the second branch flow path 620b2 are merged at the merging portion 625, and the merged second temperature control medium TCM2 flows through the pressure feeding flow path 620a and is temporarily stored in the storage tank 623. Then, the second temperature control medium TCM2 stored in the storage tank 623 is supplied again to the second pump 621 through the pressure feeding flow path 620a, thereby the second temperature control medium TCM2 circulating through the second temperature control circuit 62.

In the present embodiment, the first branch flow path 620b1 and the second branch flow path 620b2 are formed such that a flow rate of the second temperature control medium TCM2 flowing through the first brand flow path 620b1 is larger than a flow rate of the second temperature control medium TCM2 flowing through the second branch flow path 620b2.

The second temperature control circuit 62 is provided with a second temperature sensor 62a that detects a temperature of the second temperature control medium TCM2 circulating through the second temperature control circuit 62. In the present embodiment, the second temperature sensor 62a is provided in the pressure feeding flow path 620a between the radiator 622 and the branching portion 624, and detects the temperature of the second temperature control medium TCM2 discharged from the radiator 622. The second temperature sensor 62a outputs a detection value of the temperature of the second temperature control medium TCM2 discharged from the radiator 622 to the control device ECU.

In the first temperature control circuit 61, when it is assumed that the temperature of the first temperature control medium TCM1 stored in the storage part 612 after cooling the electric motor 20, the generator 30, and the transmission device 40 is about 100 [° C.], the first temperature control medium TCM1 of about 100 [° C.] is supplied to the heat exchanger 63.

On the other hand, in the second temperature control circuit 62, when it is assumed that the temperature of the second temperature control medium TCM2 cooled by the radiator 622 is about 40 [° C.], since the second temperature control medium TCM2 to be supplied to the heat exchanger 63 does not pass through the electric-power conversion unit 50 that is a temperature controlled device, the second temperature control medium TCM2 of about 40 [° C.] is supplied to the heat exchanger 63.

In this case, in the heat exchanger 63, heat exchange between the first temperature control medium TCM1 of about 100 [° C.] and the second temperature control medium TCM2 of about 40 [° C.], which are supplied to the heat exchanger 63, is performed. Then, the first temperature control medium TCM1 of about 80 [° C.] is discharged from the heat exchanger 63 to a downstream side of the first branch flow path 610b1 of the first temperature control circuit 61, and the second temperature control medium TCM2 of about 70 [° C.] is discharged from the heat exchanger 63 to a downstream side of the second branch flow path 620b2 of the second temperature control circuit 62.

In this way, since the first temperature control medium TCM1 is cooled in the heat exchanger 63, the temperature control circuit 60 can cool the first temperature control medium TCM1 without providing a radiator for cooling the first temperature control medium TCM1. Therefore, since the temperature control circuit 60 can cool the first temperature control medium TCM1 flowing through the first temperature control circuit 61 and the second temperature control medium TCM2 flowing through the second temperature control circuit 62 by one radiator 622, the temperature control circuit 60 can be miniaturized.

The control device ECU is implemented by, for example, an electronic control unit (ECU) including a processor that performs various types of calculation, a storage device that stores various types of information, an input and output device that controls input and output of data between the inside and the outside of the control device ECU, and the like, and performs overall control of the entire vehicle V. The control device ECU may be implemented by a single ECU or may be implemented by a plurality of ECUs. The control device ECU controls, for example, the internal combustion engine ICE, the electric-power conversion unit 50, the second pump 621, the valve device 626, the grille shutter 70, and the like.

In general, viscosity of the first temperature control medium TCM1 increases as the temperature thereof decreases. When the viscosity of the first temperature control medium TCM1 increases, a friction loss generated in the electric motor 20 and the transmission device 40 increases, and output efficiency of the electric motor 20 and the transmission device 40 decreases. Therefore, in a case where the temperature of the first temperature control medium TCM1 is low (for example, the temperature of the first temperature control medium TCM1 is equal to or lower than a predetermined value), for example, immediately after start of the electric motor 20 and the generator 30, it is preferable that the first temperature control medium TCM1 is not cooled (that is, it is preferable to raise the temperature of the first temperature control medium TCM1).

Therefore, the control device ECU controls the valve device 626 based on the temperature of the first temperature control medium TCM1 detected by the first sensor 61a and the temperature of the second temperature control medium TCM2 detected by the second temperature sensor 62a. Specifically, when the temperature of the first temperature control medium TCM1 is lower than the temperature of the second temperature control medium TCM2, the control device ECU controls the valve device 626 such that the flow rate of the second temperature control medium TCM2 to the second branch flow path 620b2 is larger than the flow rate when the temperature of the first temperature control medium TCM1 is higher than the temperature of the second temperature control medium TCM2.

As described, when the temperature of the first temperature control medium TCM1 is lower than the temperature of the second temperature control medium TCM2, the flow rate to the second branch flow path 620b2 is increased so that the heat exchange between the first temperature control medium TCM1 and the second temperature control medium TCM2 via the heat exchanger 63 can be facilitated. Therefore, it is possible to raise the temperature of the first temperature control medium TCM1 by using the heat of the second temperature control medium TCM2, and it is possible to suppress an increase in friction loss of the electric motor 20 and the transmission device 40 caused due to the temperature of the first temperature control medium TCM1 being low.

Figure 2:
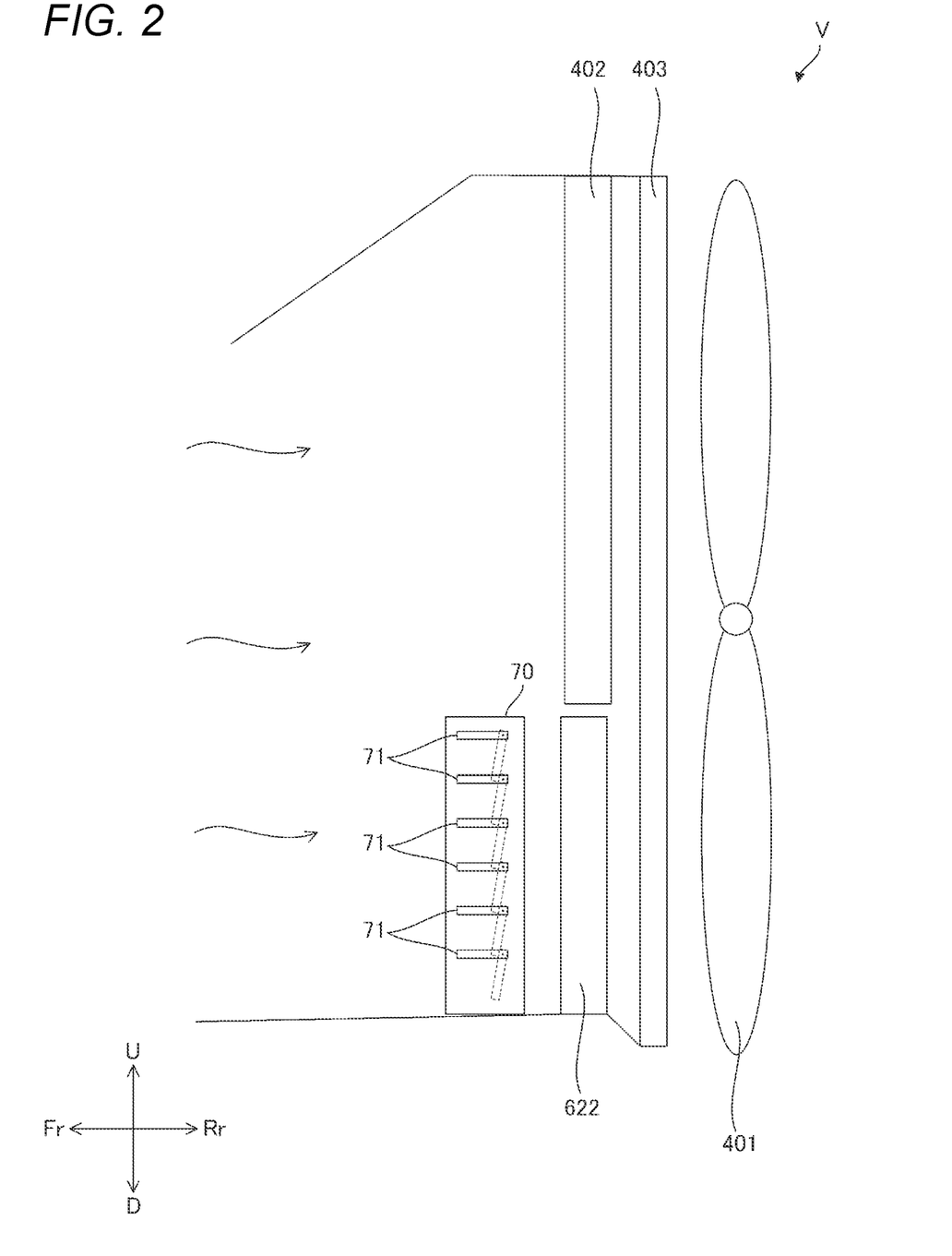
FIG. 2 is a diagram illustrating an example of a front portion of the vehicle according to the present embodiment.

As illustrated in FIG. 2, a fan 401 is provided in the front portion of the vehicle V at a rear side of the radiator 622. The fan 401 draws air from the front side (Fr) toward the rear side (Rr) of the vehicle V to introduce outside air to the radiator 622.

An air conditioner condenser 402 is a condenser of an air conditioner of the vehicle V, and is located, for example, at a front side of the fan 401 and at an upper side of the radiator 622. A first radiator 403 is a radiator for cooling the internal combustion engine ICE, and is located, for example, at the front side of the fan 401 and at a rear side of the radiator 622.

The grille shutter 70 is provided at a front side of the radiator 622. The grille shutter 70 includes a motor (not illustrated) and a louver 71 driven by the motor, and is driven and controlled by the control device ECU.

When the temperature of the first temperature control medium TCM1 is lower than the temperature of the second temperature control medium TCM2, the control device ECU controls the grille shutter 70 such that the amount of outside air that blows against the radiator 622 is smaller than the amount of the outside air when the temperature of the first temperature control medium TCM1 is higher than the temperature of the second temperature control medium TCM2.

In this way, when the temperature of the first temperature control medium TCM1 is lower than the temperature of the second temperature control medium TCM2, cooling of the second temperature control medium TCM2 by the radiator 622 can be suppressed by reducing the amount of outside air that blows against the radiator 622. Accordingly, it is possible to raise the temperature of the first temperature control medium TCM1 by more efficiently using the heat of the second temperature control medium TCM2.

Controlling the grille shutter 70 so as to reduce the amount of outside air that blows against the radiator 622 includes fully closing the grille shutter 70. For example, when the temperature of the first temperature control medium TCM1 is lower than the temperature of the second temperature control medium TCM2, the control device ECU fully closes the grille shutter 70. Accordingly, it is possible to further suppresses the cooling of the second temperature control medium TCM2 by the radiator 622. When the temperature of the second temperature control medium TCM2 exceeds a predetermined value, the control device ECU may open (for example, fully open) the grille shutter 70. In this way, it is possible to avoid an excessive increase in the temperature of the second temperature control medium TCM2.

When the temperature of the second temperature control medium TCM2 exceeds the predetermined value, the control device ECU may control the valve device 626 such that the flow rate of the second temperature control medium TCM2 to the first branch flow path 620*b*1 is larger than that before the temperature of the second temperature control medium TCM2 exceeds the predetermined value. As described, when the temperature of the second temperature control medium TCM2 exceeds the predetermined value, the flow rate of the second temperature control medium TCM2 to the first branch flow path 620*b*1 is increased, so that it is possible to avoid the second temperature control medium TCM2, which is at a high temperature, from reaching a higher temperature due to heat exchange with the first temperature control medium TCM1 via the heat exchanger 63. Here, the predetermined value is set in advance by, for example, a manufacturer of the control device ECU.

[Control Example of Valve Device and Grille Shutter by Control Device]

Figure 3:
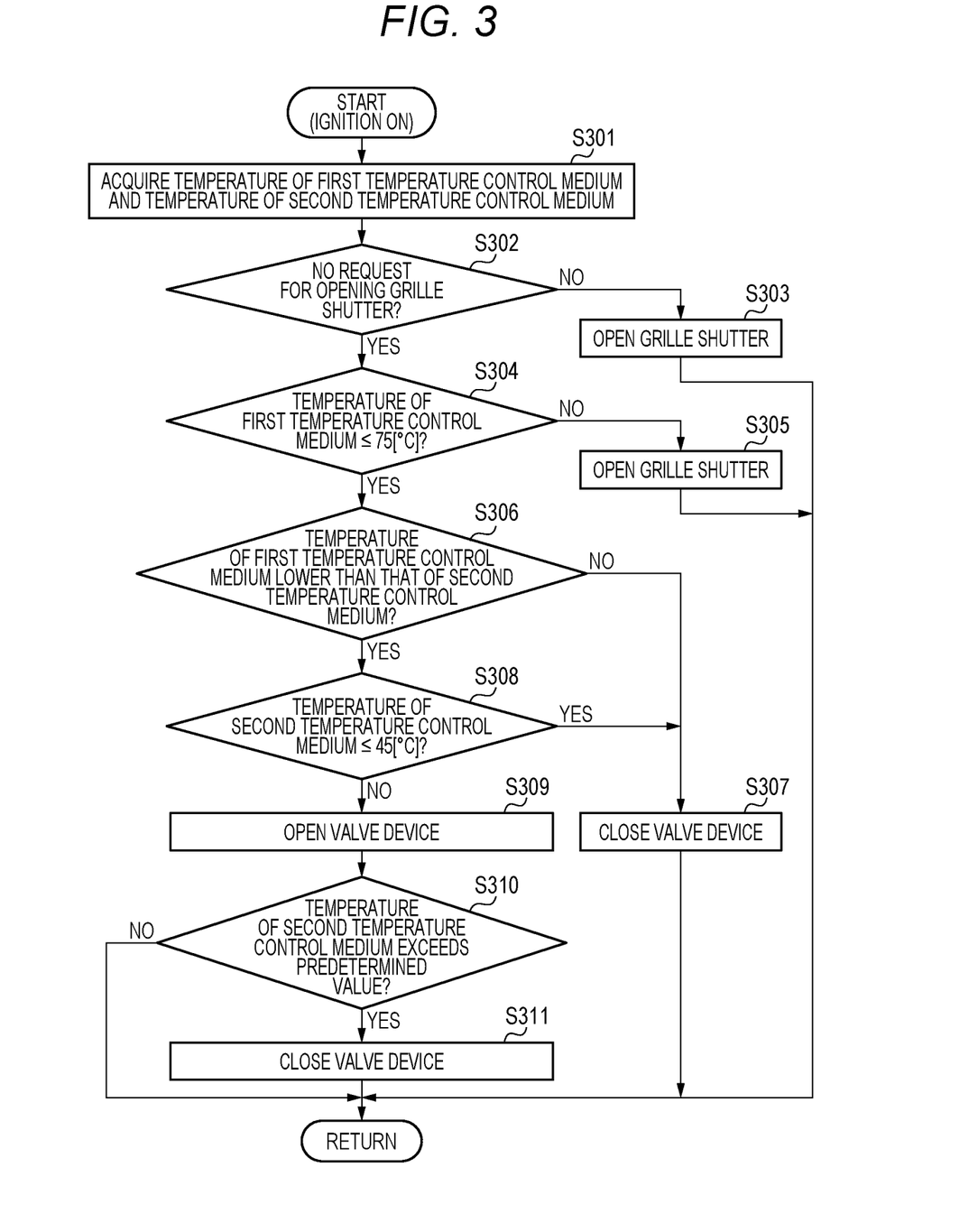
FIG. 3 is a flowchart illustrating an example of a control operation of a valve device and a grille shutter based on temperatures of a first temperature control medium and a second temperature control medium.

Next, a specific control example of the valve device 626 and the grille shutter 70 by the control device ECU will be described with reference to FIGS. 3 and 4. For example, when an ignition power supply of the vehicle V is turned on, the control device ECU executes the processing illustrated in FIG. 3.

First, the control device ECU acquires the temperature of the first temperature control medium TCM1 detected by the first temperature sensor 61*a* and the temperature of the second temperature control medium TCM2 detected by the second temperature sensor 62*a* (step S301).

Next, the control device ECU determines whether there is a request for opening the grille shutter 70 (step S302). In step S302, for example, the control device ECU determines that there is a request for opening the grille shutter 70 when the temperature of the first temperature control medium TCM1 is higher than the temperature of the second temperature control medium TCM2, and determines that there is no request for opening the grille shutter 70 when the temperature of the first temperature control medium TCM1 is lower than the temperature of the second temperature control medium TCM2. Even when the temperature of the first temperature control medium TCM1 is lower than the temperature of the second temperature control medium TCM2, the control device ECU may determine that there is a request for opening the grille shutter 70 if the temperature of the second temperature control medium TCM2 exceeds the predetermined value.

When it is determined that there is no request for opening the grille shutter 70 (step S302: Yes), the control device ECU proceeds to step S304 while keeping the grille shutter 70 closed, and when it is determined that there is a request for opening the grille shutter 70 (step S302: No), the control device ECU opens the grille shutter 70 (step S303).

Figure 4:
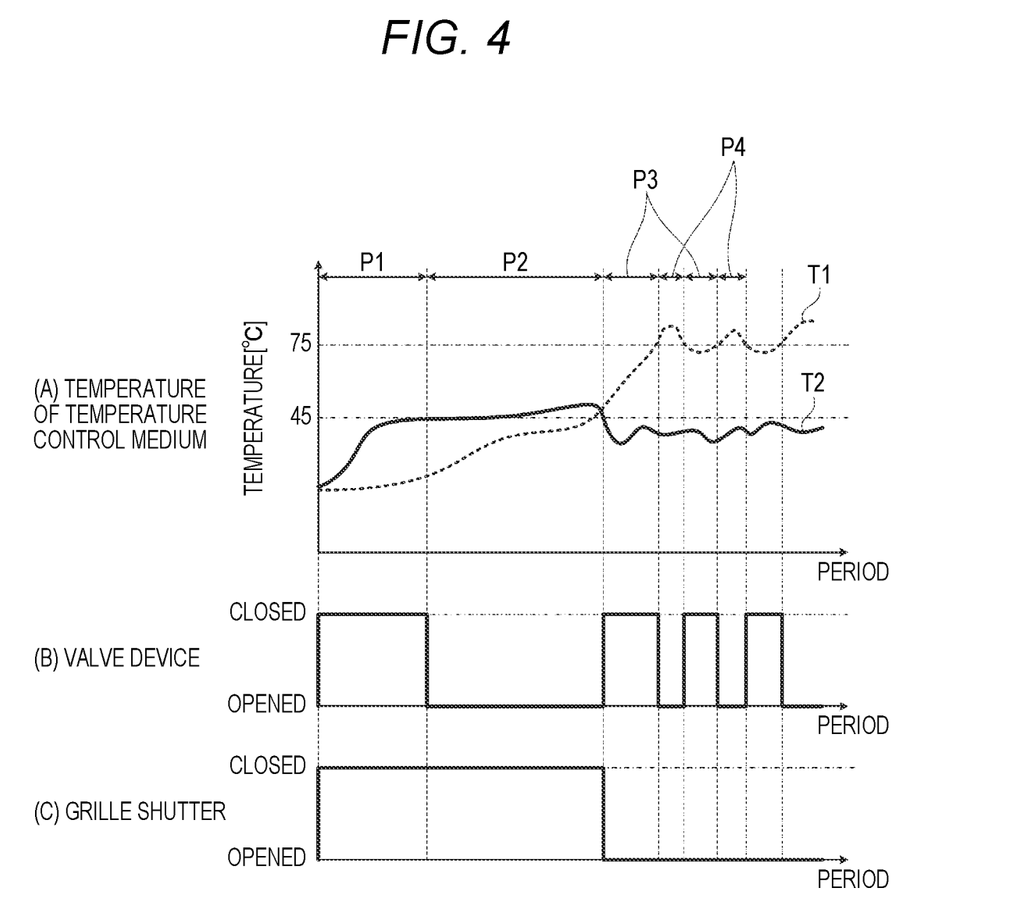
FIG. 4 is a timing chart illustrating the example of the control operation of the valve device and the grille shutter based on the temperatures of the first temperature control medium and the second temperature control medium.

That is, as illustrated in FIG. 4, during a period until the temperature T1 of the first temperature control medium TCM1 exceeding the temperature T2 of the second temperature control medium TCM2 (periods indicated by reference signs "P1" and "P2" in FIG. 4), the control device ECU maintains the grille shutter 70 in a closed state because the temperature rise of the first temperature control medium TCM1 is not completed. On the other hand, the control device ECU keeps the grille shutter 70 open in a period after the temperature T1 of the first temperature control medium TCM1 exceeding the temperature T2 of the second temperature control medium TCM2 (periods indicated by reference signs "P3" and "P4" in FIG. 4).

As described, during the period until the completion of the temperature rise of the first temperature control medium TCM1, the grille shutter 70 is kept in a closed state to reduce the amount of outside air that blows against the radiator 622, so that the cooling of the second temperature control medium TCM2 by the radiator 622 can be suppressed. Therefore, it is possible to efficiently use the heat of the second temperature control medium TCM2 to raise the temperature of the first temperature control medium TCM1. On the other hand, in a period after completion of the temperature rise of the first temperature control medium TCM1, the grille shutter 70 is kept in an opened state to increase the amount of outside air that blows against the radiator 622, so that the cooling of the second temperature control medium TCM2 by the radiator 622 can be facilitated.

Referring back to FIG. 3, in step S304, the control device ECU determines whether the temperature of the first temperature control medium TCM1 is equal to or lower than 75 [° C.] (step S304). When the control device ECU determines that the temperature of the first temperature control medium TCM1 is not equal to or lower than 75 [° C.] (step S304: No), the control device ECU opens the valve device 626 (step S305).

That is, as illustrated in FIG. 4, the control device ECU keeps the valve device 626 open during a period in which the temperature T1 of the first temperature control medium TCM1 is higher than 75 [° C.] (a period indicated by a reference sign "P4" in FIG. 4). Accordingly, heat exchange is performed between the first temperature control medium TCM1 and the second temperature control medium TCM2 via the heat exchanger 63, and the temperature rise of the first temperature control medium TCM1 is suppressed.

On the other hand, when the control device ECU determines that the temperature of the first temperature control medium TCM1 is equal to or lower than 75 [° C.] (step S304: Yes), the control device ECU proceeds to step S306. In step S306, the control device ECU determines whether the temperature of the first temperature control medium TCM1 is lower than the temperature of the second temperature control medium TCM2 (step S306). When the control device ECU determines that the temperature of the first temperature control medium TCM1 is not lower than the temperature of the second temperature control median TCM2 (step S306: No), the control device ECU closes the valve device 626 (step S307).

That is, as illustrated in FIG. 4, the control device ECU keeps the valve device 626 closed during a period in which the temperature T1 of the first temperature control medium TCM1 is equal to or lower than 75 [° C.] and the temperature T1 of the first temperature control medium TCM1 is equal to or higher than the temperature T2 of the second temperature control medium TCM2 (a period indicated by a reference sign "P3" in FIG. 4). Accordingly, it is possible to suppress the heat of the first temperature control medium TCM1 from being transferred to the second temperature control medium TCM2 via the heat exchanger 63, and it is possible to suppress an increase in the temperature of the second temperature control medium.

On the other hand, when it is determined that the temperature of the first temperature control medium TCM1 is lower than the temperature of the second temperature control medium TCM2 (step S306: Yes), the control device ECU proceeds to step S308. In step S308, the control device ECU determines whether the temperature of the second temperature control medium TCM2 is equal to or lower than 45 [° C.] (step S308). When it is determined that the temperature of the second temperature control medium TCM2 is equal to or lower than 45 [° C.] (step S308: Yes), the control device ECU proceeds to step S307 and closes the valve device 626.

That is, as illustrated in FIG. 4, the control device ECU keeps the valve device 626 closed during a period in which the temperature of the first temperature control medium TCM1 is lower than the temperature of the second temperature control medium TCM2 and the temperature of the second temperature control medium TCM2 is equal to or lower than 45 [° C.] (a period indicated by a reference sign "P1" in FIG. 4). Accordingly, it is possible to suppress the heat of the second temperature control medium TCM2 from being transferred to the first temperature control medium TCM1 via the heat exchanger 63, and to rapidly raise the temperature of the second temperature control medium TCM2.

On the other hand, when it is determined that the temperature of the second temperature control medium TCM2 is not equal to or lower than 45 [° C.] (step S308: No), the control device ECU opens the valve device 626 (step S309).

That is, as illustrated in FIG. 4, the control device ECU keeps the valve device 626 open during a period in which the temperature of the first temperature control medium TCM1 is lower than the temperature of the second temperature control medium TCM2 and the temperature of the second temperature control medium TCM2 is higher than 45 [° C.] (a period indicated by a reference sign "P2" in FIG. 4). Accordingly, since the second temperature control medium TCM2 flows through the second branch flow path 620b2 in which the heat exchanger 63 is provided, the heat of the second temperature control medium TCM2 is transferred to the first temperature control medium TCM1 via the heat exchanger 63. Therefore, it is possible to raise the temperature of the first temperature control medium TCM1 by using the heat of the second temperature control medium TCM2.

Next, the control device ECU determines whether the temperature of the second temperature control medium TCM2 exceeds a predetermined value (step S310). When it is determined that the temperature of the second temperature control medium TCM2 exceeds the predetermined value (step S370: Yes), the control device ECU closes the valve device 626 (step S311), and returns to step S301. Accordingly, it is possible to avoid the second temperature control medium TCM2, which is at a high temperature, from reaching a higher temperature due to heat exchange with the first temperature control medium TCM1 via the heat exchanger 63.

On the other hand, when the control device ECU determines that the temperature of the second temperature control medium TCM2 does not exceed the predetermined value (step S310: No), the control device ECU returns to step S301 as it is. After opening the grille shutter 70 in step S303, after opening the valve device 626 in step S305, after closing the valve device 626 in step S307, and after closing the valve device 626 in step S311, the control device ECU returns to step S301.

As described above, according to the present embodiment, during a period in which the temperature T1 of the first temperature control medium TCM1 is the lowest (for example, the period indicated by the reference sign "P1" in FIG. 4), the valve device 626 is kept closed to increase the temperature T2 of the second temperature control medium TCM2. Since the second temperature control circuit 62 does not have a larger thermal mass than the first temperature control circuit 61, the temperature of the second temperature control medium TCM2 (for example, LLC) can be rapidly increased by closing the valve device 626.

Then, during a period in which a predetermined condition is satisfied after the temperature T2 of the second temperature control medium TCM2 is set to be higher than the temperature T1 of the first temperature control medium TCM1 (for example, periods indicated by reference signs "P2" and "P4" in FIG. 4), the valve device 626 is kept open to cause the second temperature control medium TCM2 to flow through the second branch flow path 620b2 in which the heat exchanger 63 is provided. Accordingly, heat can be transferred from the second temperature control medium TCM2 to the first temperature control medium TCM1 via the heat exchanger 63, and the temperature T1 of the first temperature control medium TCM1 can be raised at an early stage.

For example, since the first temperature control circuit 61 includes components having a large thermal mass such as the electric motor 20 and the transmission device 40, there is a scene in which the temperature of the first temperature control medium TCM1 (for example, ATF) hardly rises immediately after the start of the electric motor 20 and the generator 30. From the viewpoint of reducing the friction loss of the electric motor 20 and the transmission device 40, in such a scene, it is required to increase the temperature of the first temperature control medium TCM1 at an earlier stage. According to the present embodiment, since the temperature T1 of the first temperature control medium TCM1 can be raised at an early stage by using the heat of the second temperature control medium TCM2 as described above, it is possible to reduce the friction loss of the electric motor 20 and the transmission device 40.

Although one embodiment of the present disclosure has been described above with reference to the accompanying drawings, it goes without saying that the present disclosure is not limited to such an embodiment. It will be apparent to those skilled in the art that various changes and modifications may be conceived within the scope of the claims. It is also understood that the various changes and modifications belong to the technical scope of the present disclosure. In addition, the constituent elements in the above embodiment may be combined freely without departing from the spirit of the present disclosure.

For example, although a configuration in which the vehicle V includes the internal combustion engine ICE has been described, the vehicle V may be an electric vehicle that does not include the internal combustion engine ICE.

Although a configuration in which the electric-power conversion unit 50 and the heat exchanger 63 are arranged in parallel is described, the electric-power conversion unit 50 and the heat exchanger 63 may be arranged in series. For example, the electric-power conversion unit 50 may be arranged between the radiator 622 and the branching portion 624.

In the present description, at least the following matters are described. In the parentheses, the corresponding components and the like in the above embodiment are shown as an example, and the present disclosure is not limited thereto.

(1) A vehicle temperature control system (vehicle temperature control system 10), including:
a first temperature control circuit (first temperature control circuit 61) that is provided with a first pump (first pump 611) and that is configured to perform temperature control of a rotary electric machine (electric motor 20) and a gearbox (transmission device 40) provided in a vehicle (vehicle V);
a second temperature control circuit (second temperature control circuit 62) that is provided with a second pump (second pump 621) and that is configured to perform temperature control of an electric-power conversion unit (electric-power conversion unit 50) provided in the vehicle;
a heat exchanger (heat exchanger 63) in which heat exchange between a first temperature control medium circulating through the first temperature control circuit and a second temperature control medium circulating through the second temperature control circuit is performed; and
a control device (control device ECU),
in which the first temperature control circuit includes a first temperature sensor (first temperature sensor 61*a*) that is configured to detect a temperature of the first temperature control medium,
in which the second temperature control circuit includes
a second temperature sensor (second temperature sensor 62*a*) that is configured to detect a temperature of the second temperature control medium,
a radiator (radiator 622) with which heat exchange between the second temperature control medium and outside air is performed,
a first branch flow path (first branch flow path 620*b*1) of the second temperature control medium that bypasses the heat exchanger,
a second branch flow path (second branch flow path 620*b*2) of the second temperature control medium that passes through the heat exchanger, and
a flow rate control valve (valve device 626) with which a flow rate of the second temperature control medium to the second branch flow path is controlled, and
in which the control device is capable of controlling the flow rate control valve based on the temperature of the first temperature control medium detected by the first temperature sensor and the temperature of the second temperature control medium detected by the second temperature sensor, and
in a case where the temperature of the first temperature control medium is lower than the temperature of the second temperature control medium, the control device controls the flow rate control valve such that a flow rate to the second branch flow path is larger than a flow rate in a case where the temperature of the first temperature control medium is higher than the temperature of the second temperature control medium.

According to (1), when the temperature of the first temperature control medium is lower than the temperature of the second temperature control medium, the control device controls the flow rate control valve such that the flow rate to the second branch flow path increases, and thus it is possible to facilitate the heat exchange between the first temperature control medium and the second temperature control medium via the heat exchanger. Therefore, it is possible to rapidly raise the temperature of the first temperature control medium by using the heat of the second temperature control medium, and it is possible to suppress an increase in friction loss of the rotary electric machine and the gearbox caused due to a temperature of the first temperature control medium being low.

(2) The vehicle temperature control system according to (1),
in which the vehicle further includes a shutter (grille shutter 70) that is configured to be opened and closed under control of the control device so as to be capable of controlling an amount of outside air blowing against the radiator, and
in which in a case where the temperature of the first temperature control medium is lower than the temperature of the second temperature control medium, the control device further controls the shutter such that the amount of outside air blowing against the radiator is smaller than an amount of the outside air in a case where the temperature of the first temperature control medium is higher than the temperature of the second temperature control medium.

According to (2), when the temperature of the first temperature control medium is lower than the temperature of the second temperature control medium, the control device controls the shutter so as to reduce the amount of outside air blowing against the radiator, thereby making it possible to suppress cooling of the second temperature control medium by the radiator. Accordingly, it is possible to raise the temperature of the first temperature control medium by more efficiently using the heat of the second temperature control medium.

(3) The vehicle temperature control system according to (1) or (2),
in which in a case where the temperature of the second temperature control medium exceeds a predetermined value, the control device further controls the flow rate control valve such that a flow rate to the first branch flow path is larger than a flow rate before the temperature of the second temperature control medium exceeds the predetermined value.

According to (3), when the temperature of the second temperature control medium exceeds the predetermined value, the control device controls the flow rate control valve so that the flow rate to the first branch flow path increases, and thus it is possible to suppress the second temperature control medium, which is at a high temperature, from reaching a higher temperature due to heat exchange with the first temperature control medium via the heat exchanger.

The invention claimed is:

1. A vehicle temperature control system, comprising:
   a first temperature control circuit that is provided with a first pump and that is configured to perform temperature control of a rotary electric machine and a gearbox provided in a vehicle;
   a second temperature control circuit that is provided with a second pump and that is configured to perform temperature control of an electric-power conversion unit provided in the vehicle;
   a heat exchanger in which heat exchange between a first temperature control medium circulating through the first temperature control circuit and a second temperature control medium circulating through the second temperature control circuit is performed; and
   a control device,
   wherein the first temperature control circuit includes a first temperature sensor configured to detect a temperature of the first temperature control medium,
   wherein the second temperature control circuit includes
      a second temperature sensor configured to detect a temperature of the second temperature control medium,
      a radiator with which heat exchange between the second temperature control medium and outside air is performed,
      a first branch flow path of the second temperature control medium that bypasses the heat exchanger,
      a second branch flow path of the second temperature control medium that passes through the heat exchanger, and
      a flow rate control valve with which a flow rate of the second temperature control medium to the second branch flow path is controlled, and
   wherein the control device is capable of controlling the flow rate control valve based on the temperature of the first temperature control medium detected by the first temperature sensor and the temperature of the second temperature control medium detected by the second temperature sensor, and
   in a case where the temperature of the first temperature control medium is lower than the temperature of the second temperature control medium and the temperature of the second temperature control medium is higher than a predetermined value, the control device controls the flow rate control valve such that a flow rate to the second branch flow path is larger than a flow rate in a case where the temperature of the first temperature control medium is higher than the temperature of the second temperature control medium.

2. The vehicle temperature control system according to claim 1,
   wherein the vehicle further includes a shutter that is configured to be opened and closed under control of the control device so as to be capable of controlling an amount of outside air blowing against the radiator, and
   wherein in a case where the temperature of the first temperature control medium is lower than the temperature of the second temperature control medium, the control device further controls the shutter such that the amount of outside air blowing against the radiator is smaller than an amount of the outside air in a case where the temperature of the first temperature control medium is higher than the temperature of the second temperature control medium.

3. The vehicle temperature control system according to claim 1,
   wherein in a case where the temperature of the second temperature control medium exceeds a predetermined value, the control device further controls the flow rate control valve such that a flow rate to the first branch flow path is larger than a flow rate before the temperature of the second temperature control medium exceeds the predetermined value.

* * * * *